US010826082B2

(12) United States Patent
Baeck et al.

(10) Patent No.: US 10,826,082 B2
(45) Date of Patent: Nov. 3, 2020

(54) FUEL CELL AND METHOD FOR PRODUCING THE SAME

(71) Applicant: Hyundai Motor Company, Seoul (KR)

(72) Inventors: Suk Min Baeck, Gyeonggi-Do (KR); Dae Il Yoon, Gyeonggi-do (KR); Yoo Chang Yang, Gyeonggi-do (KR); Kook Il Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 340 days.

(21) Appl. No.: 15/255,422

(22) Filed: Sep. 2, 2016

(65) Prior Publication Data

US 2017/0346105 A1 Nov. 30, 2017

(30) Foreign Application Priority Data

May 24, 2016 (KR) ........................ 10-2016-0063658

(51) Int. Cl.
*H01M 8/0258* (2016.01)
*H01M 8/1004* (2016.01)
*H01M 8/2404* (2016.01)

(52) U.S. Cl.
CPC ....... *H01M 8/0258* (2013.01); *H01M 8/1004* (2013.01); *H01M 8/2404* (2016.02); *Y02P 70/56* (2015.11)

(58) Field of Classification Search
CPC . H01M 8/0258; H01M 8/1004; H01M 8/2404
See application file for complete search history.

(56) References Cited

U.S. PATENT DOCUMENTS

| 2004/0058223 A1* | 3/2004 | Shibata | H01M 4/8605 429/480 |
| 2004/0157111 A1* | 8/2004 | Sakamoto | H01M 4/8605 429/414 |
| 2005/0048358 A1* | 3/2005 | Takekawa | H01M 4/8807 429/450 |
| 2005/0130023 A1* | 6/2005 | Lebowitz | H01M 4/8605 429/480 |

(Continued)

FOREIGN PATENT DOCUMENTS

| JP | 2010-225477 A | 10/2010 |
| JP | 2015-018659 A | 1/2015 |

(Continued)

*Primary Examiner* — Victoria H Lynch
(74) *Attorney, Agent, or Firm* — Mintz Levin Cohn Ferris Glovsky and Popeo, P.C.; Peter F. Corless

(57) ABSTRACT

A fuel cell and a method for producing the same are provided. The fuel cell includes a membrane electrode assembly and a gas diffusion layer that is disposed at each of opposite surfaces of the membrane electrode assembly, and includes a plurality of compressed parts that are formed by pressure at positions spaced out at predetermined intervals on the gas diffusion layer. The fuel cell further includes a separator that is in contact with an outer surface of the gas diffusion layer, and has a plurality of land parts that protrude toward the gas diffusion layer, and a plurality of channel parts that form flow paths between the land parts. The land parts respectively protrude toward the compressed parts of the gas diffusion layer to come in contact with the compressed parts.

4 Claims, 6 Drawing Sheets

(56) References Cited

U.S. PATENT DOCUMENTS

2011/0081591 A1* 4/2011 Scherer .............. H01M 8/0204
                                                        429/457
2016/0308238 A1* 10/2016 Ichihara ................ H01M 8/242
2017/0207477 A1* 7/2017 Heinzmann ......... H01M 8/2432

FOREIGN PATENT DOCUMENTS

| KR | 10-2011-0044051 A | 4/2011 |
| KR | 10-2011-0062552 A | 6/2011 |
| KR | 10-2012-0036695 A | 4/2012 |
| KR | 2013-0085327 A | 7/2013 |

* cited by examiner

FUEL CELL AND METHOD FOR PRODUCING THE SAME

CROSS REFERENCE TO RELATED APPLICATION

The present application claims priority to Korean Patent Application No. 10-2016-0063658, filed May 24, 2016, the entire contents of which is incorporated herein for all purposes by this reference.

BACKGROUND

Field of the Invention

The present invention relates generally to a fuel cell and a method for producing the same, the fuel cell maintaining coupling force and pressure that are respectively equal to or greater than preset levels in spite of repeated pressurization and depressurization, generated during operation of a fuel cell stack, by applying pressure to a gas diffusion layer of the fuel cell that is in contact with a separator of the fuel cell in advance of coupling a plurality of unit cells to form the fuel cell stack, thereby preventing performance degradation of the fuel cell.

Description of the Related Art

Generally, a unit cell of a fuel cell stack includes repeated main components having a metal separator, a gas diffusion layer, and a membrane electrode assembly. In particular, the metal separator and the gas diffusion layer support a reaction portion structure of the fuel cell stack, and transfer and maintain surface pressure.

The unit cells are repeatedly stacked and coupled to each other by being compressed, thereby forming the fuel cell stack. Additionally, lands are portions where flow paths of the metal separator, which has a concave-convex structure, are in contact with the gas diffusion layer. The channels are portions where the flow paths of the metal separator are in non-contact with the gas diffusion layer and function as reaction gas paths. The lands of the metal separator are in contact with the gas diffusion layer to transfer the surface pressure, and the channels are in contact with spaces between the metal separators to transfer the surface pressure. A mechanical structure of the fuel cell stack is maintained by a structure transferring the surface pressure of a reaction surface and by gaskets. The surface pressure of the reaction surface is determined based on the gas diffusion layer having a porous structure and on a structure supporting the lands of the metal separator.

The unit cells of the fuel cell stack are coupled to each other using a coupling press under preset surface pressure. However, internal surface pressure may increase or decrease based on variables such as operation of the fuel cell, etc. According to a result obtained by pressure evaluation (e.g., change from a pressurization state to a depressurization state) of a combination of the metal separator and the gas diffusion layer, which are repeated components of the fuel cell stack, degradation of the surface pressure is generated by a characteristic (e.g., generation of permanent pressure) of the repeated components during a change from the pressurization state (e.g., operation of the fuel cell stack at a high temperature) to the depressurization state (e.g., cooling of the fuel cell stack). The degradation of the surface pressure of reaction surface, caused by the repeated changes of the surface pressure of the reaction surface, directly results in performance degradation of the fuel cell stack.

The foregoing is intended merely to aid in the understanding of the background of the present invention, and is not intended to mean that the present invention falls within the purview of the related art that is already known to those skilled in the art.

SUMMARY

Accordingly, the present invention provides a fuel cell and a method for producing the same, the fuel cell maintaining coupling force and pressure that are respectively equal to or greater than preset levels in spite of repeated pressurization and depressurization, which are generated during operation of a fuel cell stack, by applying pressure to a gas diffusion layer of the fuel cell that is in contact with a separator of the fuel cell in advance of coupling a plurality of unit cells to form the fuel cell stack, thereby preventing performance degradation of the fuel cell.

According to one aspect of the present invention, a fuel cell may include: a membrane electrode assembly; a gas diffusion layer disposed at each of opposite surfaces of the membrane electrode assembly, and having a plurality of compressed parts formed by pressure at positions spaced out at predetermined intervals on the gas diffusion layer; and a separator in contact with an outer surface of the gas diffusion layer, and having a plurality of land parts that protrude toward the gas diffusion layer, and a plurality of channel parts that form flow paths between the land parts, wherein the land parts respectively protrude toward the compressed parts of the gas diffusion layer to come in contact with the compressed parts, wherein a plurality of unit fuel cells individually including the membrane electrode assembly, the gas diffusion layer, and the separator may be stacked and coupled to each other by being compressed, and when the plurality of the unit fuel cells are compressed, the compressed parts of the gas diffusion layer may be further compressed by the land parts of the separator.

The compressed parts of the gas diffusion layer may be disposed at positions where the gas diffusion layer is in contact with the land parts of the separator. Additionally, the compressed parts of the gas diffusion layer may be formed by receiving the pressure, applied to the separator, via the land parts of the separator when the separator overlays with the gas diffusion layer. The membrane electrode assembly, the diffusion layer and the separator may be overlaid and may receive the pressure to form the compressed parts, thereby forming a unit fuel cell, and a plurality of unit fuel cells may be stacked, and coupled to each other by being compressed.

The gas diffusion layer may be disposed at each of the opposite sides of the membrane electrode assembly, and the separator may be disposed on the outer surface of the gas diffusion layer, and the compressed parts of the gas diffusion layers disposed at the opposite sides of the membrane electrode assembly may be formed at corresponding positions. The land parts of the separators disposed on the outer surfaces of the gas diffusion layers may be disposed at corresponding positions, and may be in contact with the compressed parts respectively facing the land parts.

According to another aspect, a method for producing a fuel cell may include: overlaying a membrane electrode assembly, a gas diffusion layer, and a separator; forming compressed parts on the gas diffusion layer at positions where the gas diffusion layer is in contact with land parts of the separator by applying pressure to the overlaid membrane electrode assembly, gas diffusion layer, and separator; and stacking a plurality of unit fuel cells individually including the compressed membrane electrode assembly, gas diffusion layer, and separator, and coupling the plurality of unit fuel cells to each other by compressing the plurality of unit fuel cells.

The overlaying of the membrane electrode assembly, the gas diffusion layer, and the separator may include: disposing the gas diffusion layer at each of opposite sides of the membrane electrode assembly, and disposing the separator on an outer surface of the gas diffusion layer. At the overlaying of the membrane electrode assembly, the gas diffusion layer and the separator, and the separators disposed on the opposite sides of the membrane electrode assembly may be disposed to disposed land parts of the separators at corresponding positions to face each other. The pressure applied at the forming of the compressed parts may be two or more times greater than pressure applied to the gas diffusion layers at the compressing of the plurality of the unit fuel cells. The pressure applied at the forming of the compressed parts may be equal to or greater than pressure causing plastic deformation of the gas diffusion layer.

According to still another aspect, a method for producing a fuel cell may include: forming a plurality of compressed parts by applying pressure at positions spaced out at predetermined intervals on a gas diffusion layer; disposing a membrane electrode assembly, the gas diffusion layer, and a separator such that the compressed parts of the gas diffusion layer come in contact with land parts of the separator, thereby forming a unit fuel cell; and stacking a plurality of unit fuel cells individually including the membrane electrode assembly, the gas diffusion layer, and the separator, and coupling the plurality of the unit fuel cells to each other by compressing the plurality of unit fuel cells.

According to yet still another aspect, a method for producing a fuel cell may include: forming a plurality of compressed parts on a gas diffusion layer by firstly applying pressure at positions where the gas diffusion layer will be in contact with land parts of a separator, overlaying the gas diffusion layer having the compressed parts, a membrane electrode assembly and the separator to form a unit fuel cell, stacking a plurality of unit fuel cells, and coupling the plurality of unit fuel cells by secondly applying pressure to the plurality of unit fuel cells.

According to the present invention, the fuel cell and method for producing the fuel cell may maintain coupling force and pressure that are respectively equal to or greater than preset levels in spite of repeated pressurization and depressurization, generated during operation of the fuel cell stack, by applying pressure to the gas diffusion layer of the fuel cell that is in contact with the separator of the fuel cell in advance of coupling a plurality of unit cells to form the fuel cell stack, thereby preventing performance degradation of the fuel cell.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
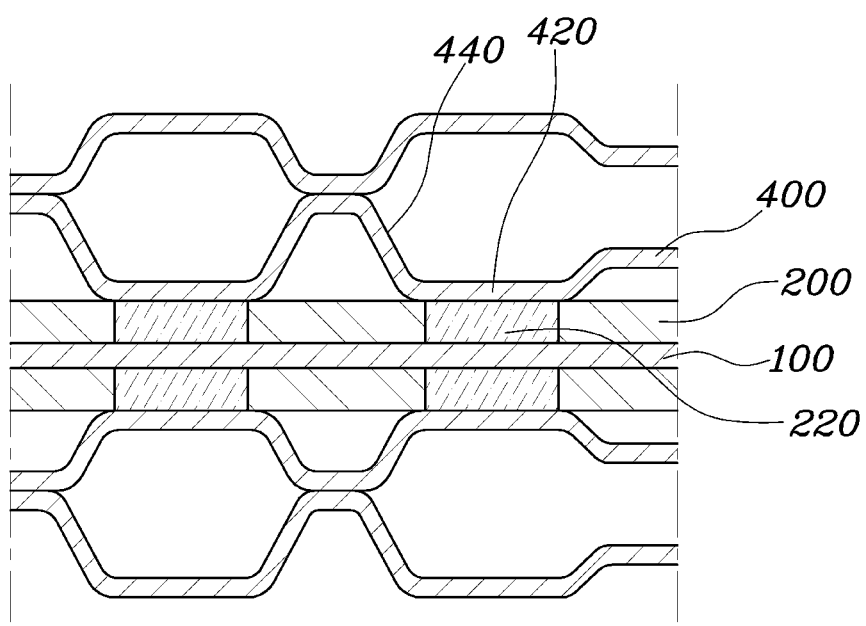
FIG. 1 is a sectional view showing a fuel cell according to an exemplary embodiment of the present invention.
Figure 2:
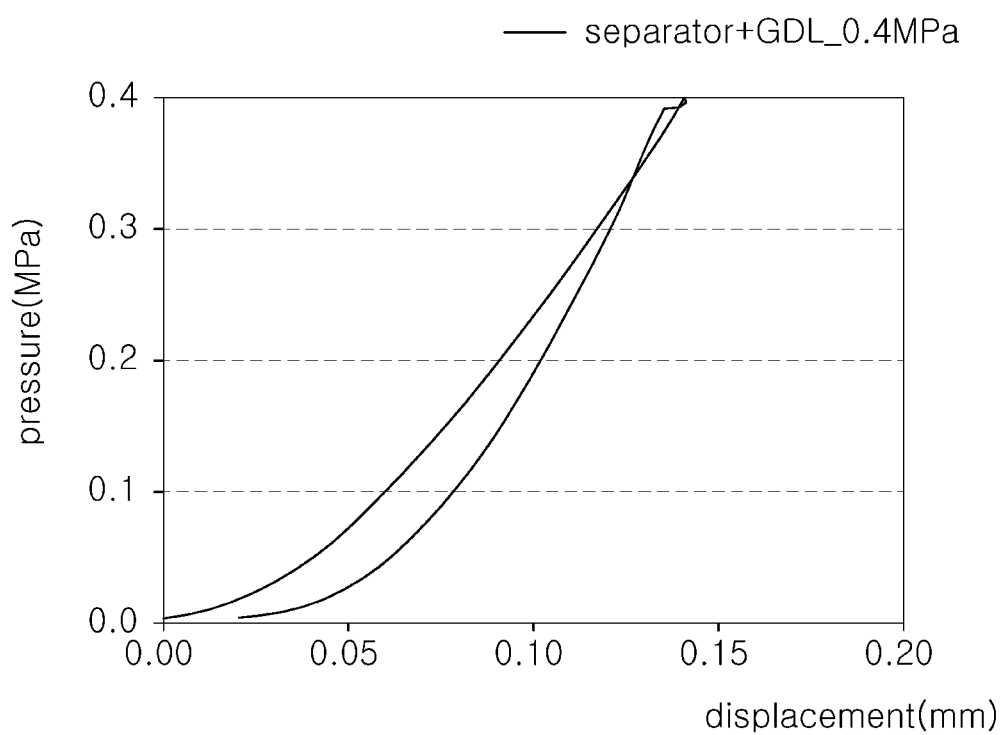
FIGS. 2 and 3 are graphs respectively showing pressure evaluation results of a conventional fuel cell and a fuel cell according to an exemplary embodiment of the present invention.
Figure 3:
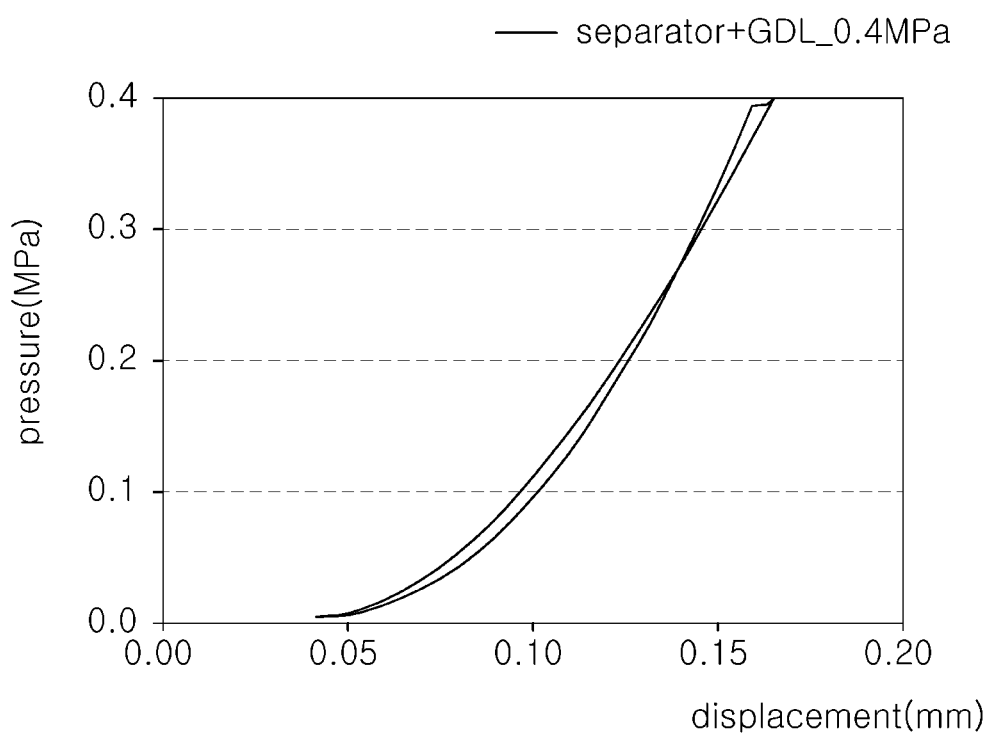
Figure 4:
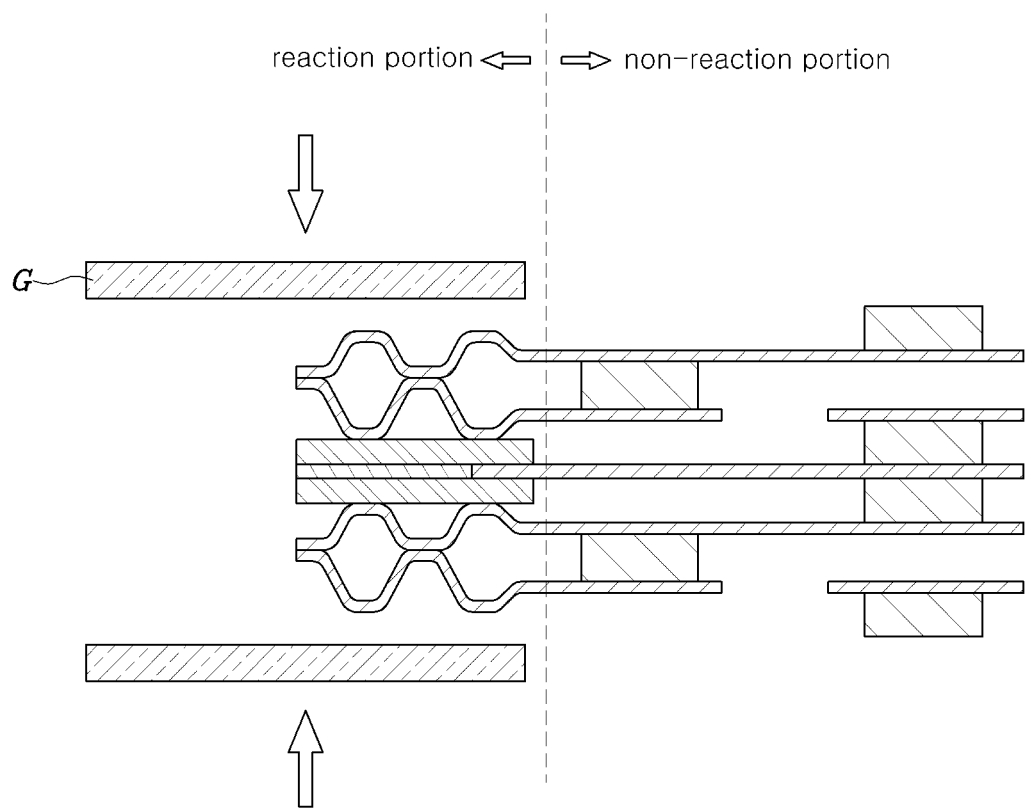
FIG. 4 is a view showing a process of producing a fuel cell according to an exemplary embodiment of the present invention.
Figure 5:
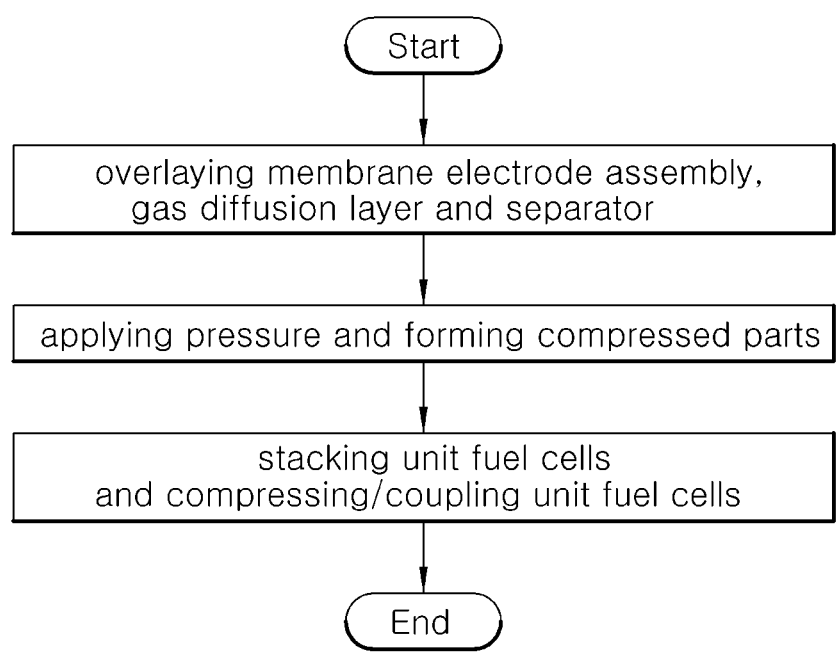
FIGS. 5 and 6 are flowcharts showing a method for producing a fuel cell according to an exemplary embodiment of the present invention.
Figure 6:
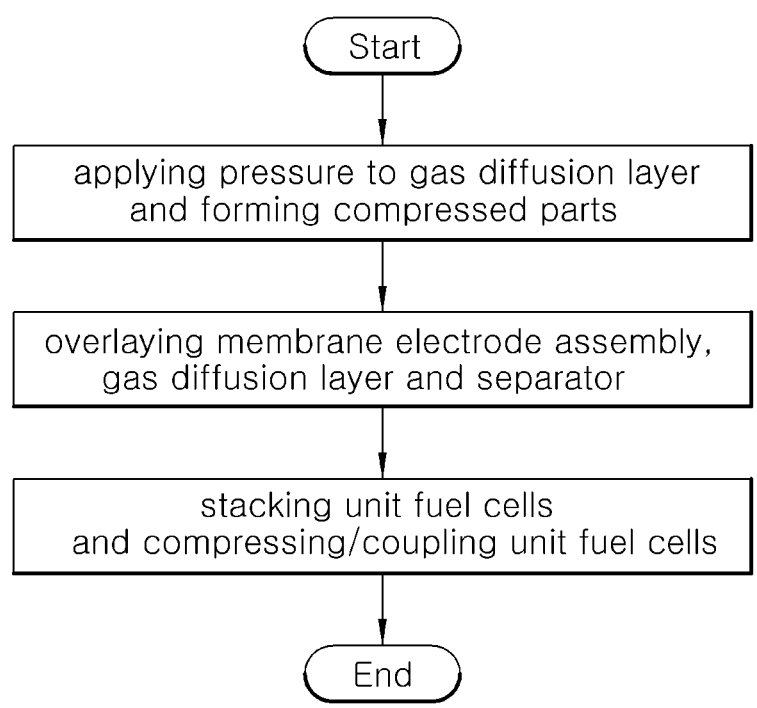

FIG. 1 is a sectional view showing a fuel cell according to an exemplary embodiment of the present invention. FIGS. 2 and 3 are graphs respectively showing pressure evaluation results of a conventional fuel cell and a fuel cell according to an exemplary embodiment of the present invention. FIG. 4 is a view showing a process of producing a fuel cell according to an exemplary embodiment of the present invention. FIGS. 5 and 6 are flowcharts showing a method for producing a fuel cell according to an exemplary embodiment of the present invention.

According to an exemplary embodiment of the present invention, the fuel cell may include a membrane electrode assembly 100; a gas diffusion layer 200 disposed at each of opposite surfaces of the membrane electrode assembly 100, and having a plurality of compressed parts 220 formed by pressure at positions spaced out at predetermined intervals on the gas diffusion layer; and a separator 400 in contact with an outer surface of the gas diffusion layer 200, and having a plurality of land parts 420 that protrude toward the gas diffusion layer 200, and a plurality of channel parts 440 that form flow paths between the land parts 420, wherein the land parts 420 respectively protrude toward the compressed parts 220 of the gas diffusion layer 200 to come in contact with the compressed parts 220, wherein a plurality of unit fuel cells individually including the membrane electrode assembly 100, the gas diffusion layer 200 and the separator 400 may be stacked and coupled to each other by being compressed, and when the plurality of the unit fuel cells are compressed, the compressed parts 220 of the gas diffusion layer 200 may be further compressed by the land parts 420 of the separator 400.

The unit fuel cells may be coupled to each other under preset surface pressure using a coupling press, etc. However, the internal surface pressure of the fuel cell may repeatedly increase or decrease based on variables such as operation of the fuel cell, etc. According to a result obtained by pressure evaluation (e.g., change from a pressurization state to a depressurization state) of a combination of the separator 400 and the gas diffusion layer 200, which are repeated components of a fuel cell stack, permanent degradation of surface pressure may be generated by a characteristic (e.g., generation of permanent pressure) of the repeated components during a change from the pressurization state (e.g., operation of the fuel cell stack at a high temperature) to the depressurization state (e.g., cooling of the fuel cell stack). The permanent degradation of the surface pressure of a reaction surface, caused by the repeated changes of the surface pressure of the reaction surface, directly results in performance degradation of the fuel cell stack.

The surface pressure of the combination of the gas diffusion layer 200 and the separator 400 made of metal, which are repeated components, may decrease during the repeating of pressurization/depressurization evaluation that mimics or imitates a running condition of the fuel cell. Therefore, contact resistance of the repeated components may increase, thereby reducing system efficiency. The exemplary embodiment of the present invention provides a method of selectively compressing the gas diffusion layer 200 that applies selective pressure to positions where the gas diffusion layer 200 is in contact with the land parts 420 of the separator 400, thereby minimizing surface pressure degradation of the reaction surface of the fuel cell stack.

Further, pressure to a reaction portion may be implemented in a process of testing whether unit fuel cells are airtight (e.g., testing a seal) before the unit fuel cells are stacked, wherein each of the unit fuel cells may include a set of separators 400, one membrane electrode assembly, and a gas diffusion layer. In addition, it may be possible to apply even pressure (e.g., consistent pressure) to each of the unit fuel cells. Alignments of the unit fuel cells individually including the repeated components may be matched using junctions of the separators 400 and using alignment reference apertures/cartridge reference points (e.g., the positions may be adjusted to correspond to each other).

FIG. 1 is a sectional view showing a fuel cell according to an exemplary embodiment of the present invention. According to the exemplary embodiment of the present invention, a plurality of unit fuel cells may be stacked to form a fuel cell stack, and each of the unit fuel cells may include a membrane electrode assembly (MEA) 100, a gas diffusion layer (GDL) 200, and a separator 400. In particular, the gas diffusion layer 200 and the separator 400 have influence on pressure. Pressure degradation between the gas diffusion layer 200 and the separator 400 may be prevented by applying pressure to the gas diffusion layer 200 in advance of coupling the plurality of unit fuel cells to each other by compressing. Therefore, a displacement change of the gas diffusion layer 200 may be minimized in spite of repeated pressurization and depressurization, thereby maintaining even pressure for a substantial period of time.

Accordingly, the gas diffusion layers 200 may be disposed at each of opposite surface of the membrane electrode assembly 100, and may include a plurality of compressed parts 220 formed by pressure at positions spaced out at predetermined intervals on the gas diffusion layer. In addition, the separator 400 may be in contact with an outer surface of the gas diffusion layer 200, and may include a plurality of land parts 420 that protrude toward the gas diffusion layer 200, and a plurality of channel parts 440 that form flow paths between the land parts 420. The land parts 420 may maintain pressure by being in contact with the gas diffusion layer 200, and the channel parts 440 may form flow paths as channels for reaction gas and for cooling water (e.g., the reaction gas and cooling water may flow through the channels). The land parts 420 of the separator 400 may respectively protrude toward the compressed parts 220 of the gas diffusion layer 200 to come in contact with the compressed parts 220.

Consequently, to form a fuel cell stack, a plurality of the unit fuel cells individually including the membrane electrode assembly 100, the gas diffusion layer 200, and the separator 400 may be stacked and coupled to each other by being compressed. When compressing the plurality of the unit fuel cells, the compressed parts 220 of the gas diffusion layer 200 may be further compressed by the land parts 420 of the separator 400.

Furthermore, the gas diffusion layer 200 may have a porous structure and may be formed of a porous material. According to characteristics thereof, when the gas diffusion layer 200 is compressed, the gas diffusion layer 200 undergoes elastic deformation, and undergoes plastic deformation at pressure equal to or greater than preset pressure. When the gas diffusion layer 200 undergoes the plastic deformation, it may be difficult to restore the gas diffusion layer 200 thus causing the thickness of the gas diffusion layer 200 to decrease. Thus, it may be difficult to maintain coupling force of the fuel cell stack. Accordingly, the gas diffusion layer 200 may be compressed in advance to cause slight plastic deformation of the gas diffusion layer 200, and then the plurality of the unit fuel cells may be stacked and coupled to each other, thereby minimizing future additional plastic deformation in spite of a pressurization state during operation of the fuel cell.

FIGS. 2 and 3 are graphs respectively showing compression test results of a conventional fuel cell and a fuel cell according to an exemplary embodiment of the present invention. Specifically, FIG. 2 corresponds to when the gas diffusion layers 200 in an initial state are stacked and a plurality of unit fuel cells are coupled by being compressed without applying pressure to the gas diffusion layer 200 in advance. When the gas diffusion layer 200 and the separator 400 are stacked and compressed with about 0.4 MPa and are decompressed, a displacement difference may occur that is a thickness difference caused by plastic deformation of the gas diffusion layer 200. Additionally, FIG. 3 corresponds to when the compressed parts 200 are formed by being compressed with about 1 MPa on the gas diffusion layer 200, and the gas diffusion layer 200 and the separator 400 are stacked and compressed with about 0.4 MPa and decompressed. By comparing the graphs of FIGS. 2 and 3, when the compressed parts 220 are formed on the gas diffusion layer 200 in advance, plastic deformation may be minimized in spite of pressurization state during operation of the fuel cell, thereby reducing the displacement difference.

In the meantime, the compressed parts 220 of the gas diffusion layer 200 may be formed at positions where the gas diffusion layer 200 is in contact with the land parts 420 of the separator 400. In other words, pressure of the fuel cell may occur at the positions where the gas diffusion layer 200 is in contact with the land parts 420 of the separator 400. Therefore, the compressed parts 220 may be formed by applying pressure to the positions in advance, thereby preventing additional plastic deformation of the positions.

Additionally, the compressed parts 220 of the gas diffusion layer 200 may be formed by receiving pressure, applied to the separator 400, via the land parts 420 of the separator when the separator 400 overlays the gas diffusion layer 200. In particular, the compressed parts 220 may be formed when the gas diffusion layer 200 overlays the separator 400 to form the compressed parts 220 at positions where the compressed parts 220 are in contact with the land parts 420. In other words, the present invention is advantageous in that it may perform the process of producing the fuel cell more efficiently. After forming the compressed parts 220, the unit fuel cells may be stacked and coupled to each other without separating the separator 400 and the gas diffusion layer 200. Therefore, it may be possible to dispose the compressed parts 220 and the land parts 420 at more accurate junctions at which the compressed parts 220 and the land parts 420 are intended to meet.

In the meantime, the membrane electrode assembly 100, the gas diffusion layer 200 and the separator 400 may be overlaid (e.g., overlapped) and may receive the pressure to form the compressed parts 220, thereby forming a unit fuel cell, and a plurality of unit fuel cells may be stacked, and coupled to each other by being compressed. Specifically, the gas diffusion layer 200 may be disposed at each of the opposite sides of the membrane electrode assembly 100, and the separator 400 may be disposed on the outer surface of the gas diffusion layer 200. The compressed parts 220 of the gas diffusion layers 200 disposed at the opposite sides of the membrane electrode assembly may be formed at corresponding positions. In other words, the land parts 420 of the separators 400 disposed on the outer surfaces of the gas diffusion layers 200 may be disposed at corresponding positions, and may be in contact with the compressed parts 220 respectively facing the land parts.

FIG. 4 is a view showing a process of producing a fuel cell according to an exemplary embodiment of the present invention. FIGS. 5 and 6 are flowcharts showing a method for producing a fuel cell according to an exemplary embodiment of the present invention.

According to an exemplary embodiment of the present invention, a method for producing a fuel cell, as shown in FIG. 5, may include overlaying a membrane electrode assembly, a gas diffusion layer, and a separator; forming compressed parts on the gas diffusion layer at positions where the gas diffusion layer is in contact with land parts of the separator by applying pressure to the overlaid membrane electrode assembly, gas diffusion layer, and separator; and stacking a plurality of unit fuel cells individually including the compressed membrane electrode assembly, gas diffusion layer, and separator, and coupling the plurality of the unit fuel cells to each other by compressing the plurality of the unit fuel cells.

The overlaying of the membrane electrode assembly, the gas diffusion layer, and the separator may include disposing the gas diffusion layer at each of opposite sides of the membrane electrode assembly, and disposing the separator on an outer surface of the gas diffusion layer. In addition, at the overlaying of the membrane electrode assembly, the gas diffusion layer, and the separator, the separators disposed on the opposite sides of the membrane electrode assembly may be disposed such that land parts of the separators may be disposed at corresponding positions to face each other. Accordingly, the gas diffusion layers, respectively disposed at the opposite sides of the membrane electrode and face each other, may receive pressure at the same position to allow the entire pressure to be symmetrically or evenly received over the gas diffusion layers, thereby more stably receiving coupling force without distortion.

Furthermore, as shown in FIG. 4, a process of forming the compressed parts may include forming the compressed parts of the gas diffusion layer by receiving pressure, applied to molds individually disposed at opposite positions of the separators, via the land parts of the separator. Moreover, the pressure of the molds may be applied to the reaction portion of a unit fuel cell, except for the non-reaction portion of the unit fuel cell. In the meantime, the pressure applied at the forming of the compressed parts may be two or more times greater than pressure applied to the gas diffusion layers at the compressing of the plurality of the unit fuel cells.

Specifically, pressure of from about 0.9 MPa to 1.1 MPa may be applied to the reaction portion of the unit fuel cell to form the compressed parts, without applying the pressure to the non-reaction portion, considering pressure of from about 0.4 MPa to 0.6 MPa at coupling of unit fuel cells to each other, an increase in a temperature of a fuel cell stack may occur during operation of the fuel cell stack, and an increase in surface pressure of a reaction surface may occur caused by inlet pressure of the reaction gas and of the cooling water. The non-reaction portion may include manifolds where reaction gas/cooling water enter and exit (e.g., are suctioned and discharged), and gaskets that block the reaction gas/the cooling water. The pressure of from about 0.9 MPa to 1.1 MPa is two times greater than the pressure of from about 0.4 MPa to 0.6 MPa applied to the gas diffusion layer during the coupling of the unit fuel cells to each other. Minimum surface pressure applied to the reaction portion may exceed about 0.9 MPa, considering an increase in surface pressure of a reaction surface caused by operation of the fuel cell stack. Maximum surface pressure applied to the reaction portion may be less than about 1.1 MPa to prevent performance degradation of the repeated components, for example degradation in gas permeability of the gas diffusion layer.

Furthermore, the pressure applied at the forming of the compressed parts may be equal to or greater than pressure causing plastic deformation of the gas diffusion layer. In other words, the compressed parts may be formed by applying pressure at least greater than the pressure causing the plastic deformation of the gas diffusion layer, thereby preventing future additional plastic deformation of the gas diffusion layer when the unit fuel cells are coupled to each other.

Moreover, according to an exemplary embodiment of the present invention, a method for producing a fuel cell, as shown in FIG. 6, may include forming a plurality of compressed parts by applying pressure at positions spaced out at predetermined intervals on a gas diffusion layer; disposing a membrane electrode assembly, the gas diffusion layer and a separator to cause the compressed parts of the gas diffusion layer to come in contact with land parts of the separator, thereby forming a unit fuel cell; and stacking a plurality of unit fuel cells individually including the membrane electrode assembly, the gas diffusion layer, and the separator, and coupling the plurality of the unit fuel cells to each other by compressing the plurality of unit fuel cells. In particular, the compressed parts may be formed on the gas diffusion layer in advance of stacking the gas diffusion layer and the separator. It is advantageous to evenly form the compressed parts; however, it should be noted that the land parts may be more accurately aligned with the compressed parts when the gas diffusion layer and the separator are stacked.

A unit fuel cell structure may include a non-reaction portion, where reaction gas and cooling water may be distributed and blocked, and a reaction portion, where electrons are generated by chemical reaction. During pressure evaluation of a reaction surface of the unit fuel cell, selective pressure may be applied to positions of diffusion portions where a metal separator is in contact with a gas diffusion layer, thereby evenly maintaining surface pressure without surface pressure hysteresis caused by pressurization and depressurization. In addition, the surface pressure applied to the reaction surface at the applying of the selective pressure may be two times greater than surface pressure applied to the reaction surface at coupling of the unit fuel cells. According to the exemplary embodiment of the present invention, surface pressure of the reaction surface may be from about 0.4 MPa to 0.55 MPa at the coupling of the unit fuel cells to form the fuel cell stack. Selective surface pressure considering performance degradation caused by overpressure of the repeated components included in a unit fuel cell and an increase in surface pressure during operation of the fuel cell stack namely, surface pressure applied to from the compressed parts may be from about 0.9 MPa to 1.1 MPa.

According to the present invention, the fuel cell and method for producing the fuel cell may maintain coupling force and pressure that are respectively equal to or greater than preset levels in spite of repeated pressurization and depressurization, generated during operation of the fuel cell stack, by applying pressure to the gas diffusion layer of the fuel cell that is in contact with the separator of the fuel cell in advance of coupling a plurality of unit fuel cells to form the fuel cell stack, thereby preventing performance degradation of the fuel cell.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for producing a fuel cell, comprising:
   overlaying a membrane electrode assembly, a gas diffusion layer, and a separator;
   forming compressed parts on the gas diffusion layer at positions where the gas diffusion layer is in contact with land parts of the separator by applying pressure to the overlaid membrane electrode assembly, gas diffusion layer, and separator; and
   stacking a plurality of unit fuel cells individually including the compressed membrane electrode assembly, gas diffusion layer, and separator, and coupling the plurality of the unit fuel cells to each other by compressing the plurality of the unit fuel cells,
   wherein the pressure applied at the forming of the compressed parts is 2-2.75 times of pressure applied to the gas diffusion layer at the stacking of the plurality of the unit fuel cells to form a fuel cell stack, and
   wherein the fuel cell includes a non-reaction portion, where reaction gas and cooling water are distributed and blocked, and a reaction portion, where electrons are generated by chemical reaction such that the pressure is applied to the reaction portion.

2. The method of claim 1, wherein the overlaying of the membrane electrode assembly, the gas diffusion layer and the separator includes:
   disposing the gas diffusion layer at each of opposite sides of the membrane electrode assembly; and
   disposing the separator on an outer surface of the gas diffusion layer.

3. The method of claim 2, wherein at the overlaying of the membrane electrode assembly, the gas diffusion layer, and the separator, the separator disposed on the opposite sides of the membrane electrode assembly are disposed with land parts of the separator disposed at corresponding positions to face each other.

4. The method of claim 1, wherein the pressure applied at the forming of the compressed parts is equal to or greater than pressure causing plastic deformation of the gas diffusion layer.

* * * * *